(12) United States Patent
Muni et al.

(10) Patent No.: US 8,386,493 B2
(45) Date of Patent: Feb. 26, 2013

(54) SYSTEM AND METHOD FOR SCHEMA MATCHING

(75) Inventors: Durga Prasad Muni, Orissa (IN); Krupa Benhur Gadde, Andhra Pradesh (IN); Srikumar Krishnamoorthy, Tamil Nadu (IN)

(73) Assignee: Infosys Technologies Limited, Bangalore, Karnataka (IN)

( * ) Notice: Subject to any disclaimer, the term of this patent is extended or adjusted under 35 U.S.C. 154(b) by 140 days.

(21) Appl. No.: 12/951,364

(22) Filed: Nov. 22, 2010

(65) Prior Publication Data

US 2012/0078913 A1    Mar. 29, 2012

(30) Foreign Application Priority Data

Sep. 23, 2010   (IN) .............................. 2771/CHE/2010

(51) Int. Cl.
*G06F 7/00* (2006.01)

(52) U.S. Cl. ....................................... 707/740; 707/803

(58) Field of Classification Search .................. 707/740, 707/803
See application file for complete search history.

(56) References Cited

U.S. PATENT DOCUMENTS

| 2005/0027681 | A1* | 2/2005 | Bernstein et al. ................. 707/1 |
| 2008/0021912 | A1* | 1/2008 | Seligman et al. ............. 707/101 |
| 2008/0313234 | A1* | 12/2008 | Chen et al. ................. 707/104.1 |
| 2011/0219044 | A1* | 9/2011 | Peukert ........................ 707/805 |

* cited by examiner

*Primary Examiner* — Jensen Hu
(74) *Attorney, Agent, or Firm* — Michael Best & Friedrich LLP

(57) ABSTRACT

A system and method for matching one or more source schemas with one or more target schemas is provided. The matching between source and target schemas is performed by gathering inputs pertaining to the source and target schemas, wherein the inputs comprises a set of details in a predefined format. Thereafter, the gathered inputs are processed by comparing the source schemas with the target schemas. The processing is performed to identify a set of matches between the source and target schemas based on the linguistic similarity, structural similarity and functional similarity and relationship between the source and target schemas. Subsequently, the identified matches are stored.

26 Claims, 11 Drawing Sheets

SYSTEM AND METHOD FOR SCHEMA MATCHING

FIELD OF INVENTION

The present invention relates generally to database application domains. More specifically, the present invention relates to schema matching.

BACKGROUND OF THE INVENTION

Database application domains such as, but not limited to, data integration, E-business, data warehousing and semantic query processing involve schema matching. Schema matching is performed to identify similarity between schemas in source and target databases. The matches are typically of two types i.e. simple and complex schema matches, wherein the simple matches represent a 1:1 mapping between schema elements of the source and target schemas and the complex matches represent a 1:N, M:1 or M:N mapping between the corresponding schema elements.

Schema matching is generally performed manually, wherein a user such as a Subject Matter Expert (SME) identifies the similarity between schemas through a Graphical User Interface (GUI). Schema matching is also performed by automating steps of schema matching. Automation includes collection of exhaustive explicit information such as, but not limited to, domain knowledge and constraint rules. The collected information is used to narrow down the search for matches between schemas. The collected information is then used to identify complex schema matches. Schema matching also includes instance data comparison based on predefined inference rules. Instance data comparison is effective in identification of simple schema matches. In addition, contextual information is used for schema matching, wherein a set of logical conditions are used to identify complex schema matches.

With recurrent growth in database application domains considerable increase in size and complexity of schemas has been observed. The increase in size and complexity makes manual identification error prone, effort intensive and time consuming. Further, there is lack of exhaustive explicit information in case of heterogeneous and distributed systems such as, but not limited to, e-commerce systems, Business-to-Business (B2B) exchanges and online cataloguing systems, which limits application of schema matching via automation. Furthermore, instance data comparison based on predefined inference rules becomes ineffective in identifying complex schema matches. Although, complex schema matches can be identified using contextual information and instance data, the number of matches identified is limited due to the set of logical conditions and the predefined inference rules, thereby limiting the scope of schema matching.

Consequently, there is need for a system and a method for efficiently matching source and target schemas. Also, the method should enable the identification of complex schema matches without manual intervention.

SUMMARY OF THE INVENTION

A system and method for matching one or more source schemas with one or more target schemas is provided. In various embodiments of the present invention, the system for matching the source schemas with the target schemas comprises an input module. The input module is configured to receive inputs pertaining to the one or more source and target schemas in a predefined format. The system further comprises a processing module configured to process the received inputs by comparing the source and target schemas to identify a set of matches based on linguistic similarity, structural similarity, functional similarity and relationships between the source and target schemas. The system also comprises an information repository configured to store the identified set of matches.

In an embodiment of the present invention, the processing module comprises a preprocessing module configured to update the received inputs. The preprocessing module updates the inputs by tokenizing one or more schema elements of the source and target schemas, validating the tokenized schema elements and assigning each validated schema element to one or more groups based on predefined criteria.

In an embodiment of the present invention, the system comprises a data profiling module configured to analyze and process instance values of one or more schema elements of the source and target schemas. The data profiling module is further configured to categorize the analyzed schema elements into one or more data profile categories.

In an embodiment of the present invention, the processing module comprises a past match checking module configured to identify matches between the source and target schemas based on predetermined mappings between pre-existing source and target schemas.

In an embodiment of the present invention, the processing module comprises a constraint mapping module configured to identify relationships between the source and target schemas.

In an embodiment of the present invention, the processing module comprises a similarity checking module configured to identify matches between the source and target schemas based on linguistic similarity, structural similarity, functional similarity and relationships between the source and target schemas.

In an embodiment of the present invention, the processing module comprises a meta-heuristic mapping module configured to identify matches between the source and target schemas based on a set of meta-heuristic mapping checks. The set of meta-heuristic mapping check comprises at least one of a genetic algorithm mapping approach and a genetic programming mapping approach.

In an embodiment of the present invention, the processing module comprises an instance mapping module configured to identify matches between the source and target schemas based on instance values of the source and target schemas.

In an embodiment of the present invention, the processing module comprises a validation module configured to validate the identified matches.

In an embodiment of the present invention, the system further comprises an output module configured to generate an output based on the identified matches.

In an embodiment of the present invention, the information repository comprises one or more information sources for identifying matches between the source and target schemas.

In various embodiments of the present invention, the method for matching the source schemas with the target schemas comprises gathering inputs pertaining to the one or more source and target schemas, wherein the inputs comprise a set of details in a predefined format. The method further comprises processing the gathered inputs, wherein processing comprises comparing the source and target schemas to identify a set of matches based on linguistic similarity, structural similarity and functional similarity and relationship between the source and target schemas. In addition, the method comprises storing the identified set of matches.

In an embodiment of the present invention, the processing of the source and target schemas further comprises tokenizing one or more schema elements of each source and target schema, wherein the tokenization of each schema element comprises identifying one or more tokens for the schema element. Thereafter, the tokenized schema elements are validated, wherein the validation is performed based on one or more information sources. Subsequently, the validated schema elements are assigned to one or more groups based on predefined criteria.

In an embodiment of the present invention, the method further comprises performing a data profiling of each schema element, wherein the data profiling comprises analyzing and processing instance values of the schema elements. The data profiling further comprises categorizing the analyzed schema elements into one or more data profile categories.

In an embodiment of the present invention, the method further comprises identifying matches between the source and target schemas based on predetermined mappings between pre-existing source and target schemas.

In an embodiment of the present invention, the method further comprises comparing constraints of the source and target schemas to identify matches between the source and target schemas.

In an embodiment of the present invention, the method further comprises performing one or more schema mapping checks, wherein the one or more schema mapping checks comprise an initial mapping check, a constraint mapping check, a similarity check, a set of meta-heuristic checks and an instance check. The initial mapping check is performed to identify matches between the source and target schemas based on predetermined mappings between pre-existing source and target schemas. The constraint mapping check is performed to identify similarity between constraints of the source and target schemas. The similarity check is performed to identify syntactic and semantic similarity between the source and target schemas. The similarity check further comprises a set of meta-heuristic mapping checks to identify mapping between one or more source schema elements and one or more target schema elements. The instance mapping check is performed to compare instance values of the source and target schema elements.

In an embodiment of the present invention, the method further comprises validating the identified set of matches. In addition, the method comprises generating an output based on the validation.

In an embodiment of the present invention, the processing of gathered inputs further comprises a genetic algorithm mapping approach for identifying matches between the source and target schemas.

The genetic algorithm approach comprises constructing a set of chromosomes for matching the source and target schemas, wherein each chromosome represents a match between at least one source schema element and at least one target schema element. The approach further comprises performing a crossover operation on one or more chromosomes of the set of chromosomes, wherein the crossover operation comprises selecting two chromosomes and interchanging of schema elements between the two chromosomes based on predefined conditions. In addition, the approach comprises performing a mutation operation on one or more chromosomes of the set of chromosomes, wherein the mutation operation comprises modifying each chromosome based on predefined conditions. Thereafter, the approach comprises identifying matches between the source and target schemas based on fitness values of the constructed set of chromosomes and fitness values of chromosomes obtained from crossover and mutation operations.

In an exemplary embodiment of the present invention, the crossover operation and the mutation operation are performed for a predetermined number of iterations. In another exemplary embodiment of the present invention, the crossover and mutation operation are performed for obtaining a predetermined number of matches.

In an embodiment of the present invention, the processing of gathered inputs further comprises a genetic programming mapping approach for identifying matches between the source and target schemas.

The genetic programming approach comprises constructing one or more trees for matching the source and target schemas, each tree comprising at least one source schema element, at least one target schema element and one or more operators, wherein each tree represents a match between the source schema element and the target schema element. The approach further comprises performing a set of operations on the constructed trees to generate new trees, each new tree being generated by modifying one or more trees. Thereafter, the approach comprises identifying matches between the source and target schemas based on fitness values of the one or more trees and the generated new trees.

In an exemplary embodiment of the present invention, the set of operations are performed for a predetermined number of iterations. In another exemplary embodiment of the present invention, the set of operations are performed for obtaining a predetermined number of matches.

In various exemplary embodiments of the present invention, the set of operations comprises an elitism operation, a copying operation, a crossover operation, a mutation operation, an insertion operation and a merging operation. The elitism operation is performed for retaining trees in the constructed trees for retaining new trees. The elitism operation is performed by retaining the trees based on the fitness value of the trees. The copying operation is performed by copying one or more trees based on predetermined conditions.

The crossover operation is performed on one or more of the constructed trees by interchanging schema elements between two trees based on predetermined conditions. The mutation operation is performed on one or more of the constructed trees by modifying one or more schema elements in the trees based on predetermined conditions. Alternately, the mutation operation is performed by modifying one or more operators in the trees based on predetermined conditions.

The insertion operation is performed on one or more of the constructed trees to insert at least one schema element and one or more operators into the trees based on predetermined conditions. The merging operation is performed on one or more of the constructed trees to combine two or more trees based on predetermined conditions.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

A system and method for database application domains is provided. The present invention more specifically provides a system and method for matching source and target schemas. Exemplary scenarios in which the present invention may be implemented include, but are not limited to, E-business applications, data integration applications and data warehousing applications. For carrying out efficient schema matching, various automated mapping checks are performed. Further, instance data comparison is performed to validate the results of the mapping checks.

In an embodiment of the present invention, the system and method disclosed provides a constraint mapping check to identify relationships between source and target schemas.

In another embodiment of the present invention, the system and method disclosed provides a similarity check for identifying matches between source and target schemas.

In yet another embodiment of the present invention, the system and method disclosed provides a genetic algorithm mapping approach to identify mappings between source and target schemas.

In yet another embodiment of the present invention, the system and method disclosed provides a genetic programming mapping approach to identify mappings between source and target schemas.

Hence, the present invention enables efficient matching of source and target schemas. The present invention also enables the identification of complex schema matches between the source and target schemas. The present invention further enables a reduction in time and effort, and increases cost savings due to automation in matching source and target schemas.

The disclosure is provided in order to enable a person having ordinary skill in the art to practice the invention. Exemplary embodiments herein are provided only for illustrative purposes and various modifications will be readily apparent to persons ordinarily skilled in the art. The general principles defined herein may be applied to other embodiments and applications without departing from the spirit and scope of the invention. The terminology and phraseology used herein is for the purpose of describing exemplary embodiments and should not be considered limiting. Thus, the present disclosure is to be accorded the widest scope encompassing numerous alternatives, modifications and equivalents consistent with the principles and features disclosed herein. For purpose of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
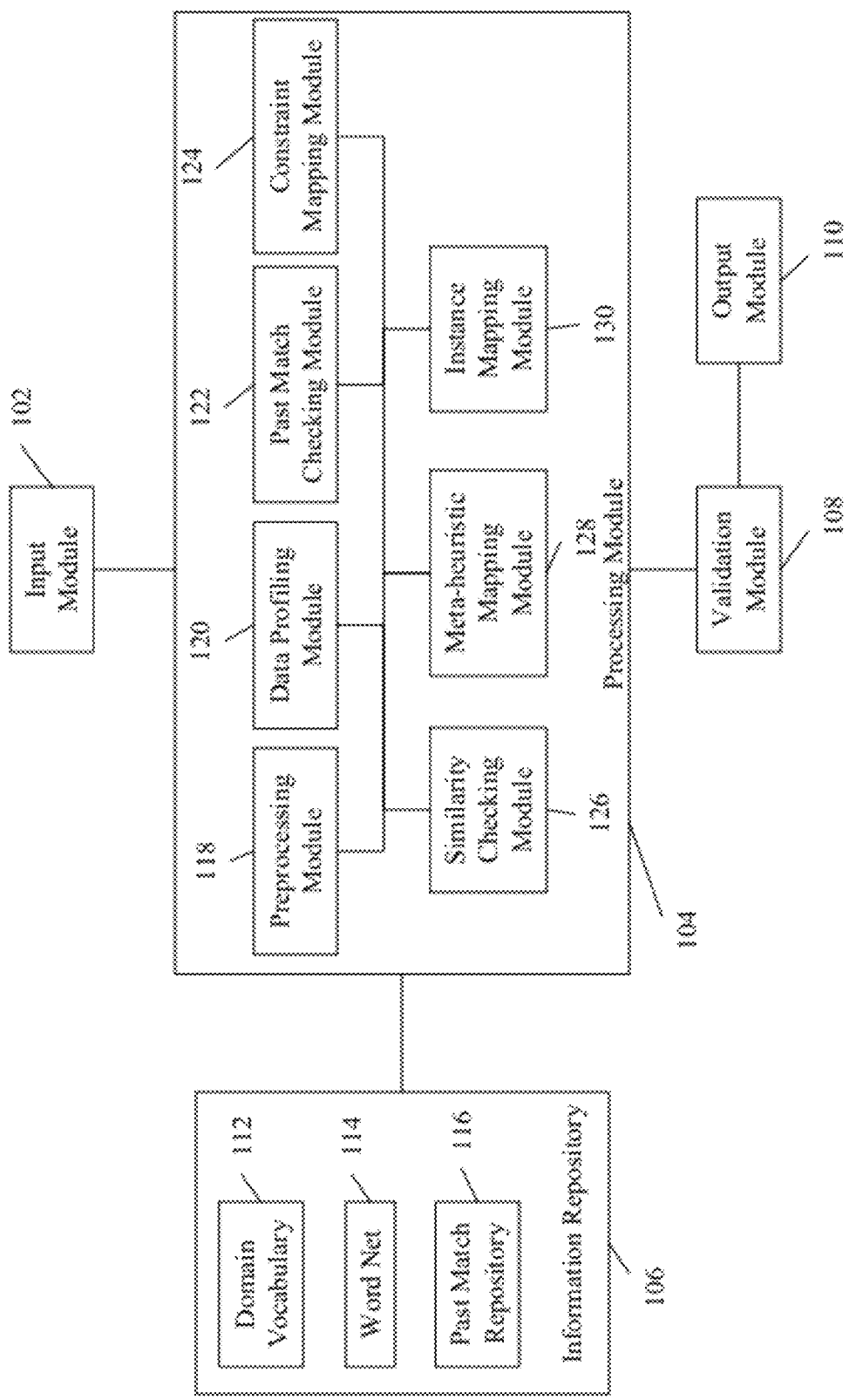
FIG. 1 illustrates a block diagram of a system for matching source and target schemas, in accordance with an embodiment of the present invention.

FIG. 1 illustrates a block diagram of a system for matching source and target schemas, in accordance with an embodiment of the present invention.

The matching between the source and target schemas is performed to identify matches or mappings between schema elements of the corresponding schemas. A match represents a semantic relation between schema elements and a mapping represents a transformation between schema elements. For example, in two schemas PO (PurchaseOrder) and Invoice as illustrated below there is a match between CustomerInfo (PurchaseOrder) and Buyer (Invoice). Further, there is a mapping between Street1, Street2 of ShipToAddress of PO to Street, AptSuite of Order of Invoice.

| Source Schema (PO) |
| --- |
| CustomerInfo (FirstName, LastName) |
| ShipToAddress (Street1, Street2, City, Province, PostalCode, Country) |
| PurchaseInfo (ItemDescription, ItemNo, Qty, Price, OrderNo, OrderDate) |

| Target Schema (Invoice) |
| --- |
| Buyer (GivenName, SurName) |
| ShippingInfo (Street, AptSuite, City, State, ZipCode, Country) |
| Order (ProdNum, ProdDesc, Quanity, Amount, PONumber, PODate, InvoiceDate, InvoiceNumber, AmountDue, ShipDate) |

Hereinafter, the terms matching and mapping and their corresponding semantic variants have been used interchangeably and encompass the meaning of both the terms.

System 100 comprises an input module 102, a processing module 104, an information repository 106, a validation module 108 and an output module 110. Input module 102 receives one or more source schemas and one or more target schemas and provides it to processing module 104, which processes the one or more source and target schemas to identify matches between the source and target schemas. The matching is performed by using one or more information sources from information repository 106. In an embodiment of the present invention, the one or more information sources include, but are not limited to, a domain vocabulary 112, a word net 114 and a past match repository 116. Processing module 104 includes one or more modules for processing the source and target schemas. In an embodiment of the present invention, processing module 104 includes a preprocessing module 118, a data profiling module 120, a past match checking module 122, a constraint mapping module 124, a similarity checking module 126, a meta-heuristic mapping module 128 and an instance mapping module 130. The source and target schemas are processed by the one or more modules of processing module 104 and an initial output is generated. The initial output is validated by validation module 108 and provided to output module 110, which generates a final output.

Input module 102 takes one or more source schemas and one or more target schemas as input, wherein each schema includes one or more schema elements. Schema elements also referred as database columns, columns, fields and so forth are basic entities of schemas and are used to represent the data contained in the schemas. Each schema element is defined for at least one of, but not limited to, representing storage of one or more data types, representing database tables and columns for storage of data. Also, one or more attributes are defined for each schema element, wherein the defined attributes represent properties of the corresponding schema elements.

Input module 102 gathers the input in a predefined format including a set of details. The predefined format is the schema definition format in which the source and target schemas are defined. In an embodiment of the present invention, the predefined format is an Extensible Markup Language (XML) format. The set of details includes the details corresponding to the schemas and their instances.

The inputs are provided to processing module 104, where the inputs are processed. Processing module 104 processes the inputs to identify matches between the source and target schema elements and generate an initial output.

Preprocessing module 118 updates the inputs provided to input module 102. Updating the inputs includes tokenization and validation. The tokenization of inputs is performed by identifying separate tokens for each schema element of the source and target schemas. The validation includes at least one of, but not limited to, expansion of abbreviations and acronyms using an information database and elimination of redundant tokens. In an embodiment of the present invention, preprocessing module 118 interacts with the one or more information sources of information repository 106 for updating the inputs.

Preprocessing module 118 also assigns the schema elements of source and target schemas to one or more groups of the set of groups. Further, preprocessing module 118 calculates mean and variance values for each schema element of the corresponding schemas.

Data profiling module 120 analyzes and processes instance data of the schema elements and categorize the schema elements into one or more data profile categories such as, but not limited to, date category, currency category, units of measurements category, schema mismatch category, phone number category and zip code category.

Past match checking module 122 identifies pre-existing mappings from information repository 106 based on an initial mapping check. In an embodiment of the present invention, past match checking module 122 interacts with the one or more information sources of information repository 106 for identifying the pre-existing matches.

Constraint mapping module 124 identifies matches between the source and target schema elements based on a constraint mapping check. Similarity checking module 126 identifies matches between the source and target schema elements based on a similarity check to identify semantic and syntactic similarity between the schema elements. Meta-heuristic mapping module 128 identifies matches between the source and target schema elements based on a set of meta-heuristic mapping checks. In an embodiment of the present invention, the set of meta-heuristic mapping checks includes a genetic algorithm mapping approach. In another embodiment of the present invention, the set of meta-heuristic checks includes a genetic programming mapping approach.

Instance mapping module 130 compares instance data of the source and target schema elements. In an embodiment of the present invention, instance mapping module 130 works in conjunction with past match checking module 122, constraint mapping module 124, similarity checking module 126 and meta-heuristic mapping module 128. In various embodiments of the present invention, instance mapping module 130 identifies instance data matches in the initial mapping check, constraint mapping check, the similarity check and the set of meta-heuristic mapping checks. The instance data matches are identified to validate the mappings identified in the corresponding mapping checks.

The processed inputs are provided to validation module 108. The processed inputs are provided as the initial output, which includes a list of mappings between the source and target schema elements. Validation module 108 validates the initial output. In an embodiment of the present invention, a Subject Matter Expert (SME) validates the initial output via validation module 108. Validation module 108 also updates the initial output based on the validation. In an embodiment of the present invention, the SME validates the initial output and performs a final mapping check to check for further matches between the source and target schema elements. The SME updates the initial output based on the validation and the final mapping check.

The updated initial output is provided to output module 110, which generates a final output based on the updated initial output. The final output includes a list of matches between the source and target schemas. In an embodiment of the present invention, output module 110 provides the list of matches to information repository 106. The list of matches is used to update past match repository 116.

Figure 2:
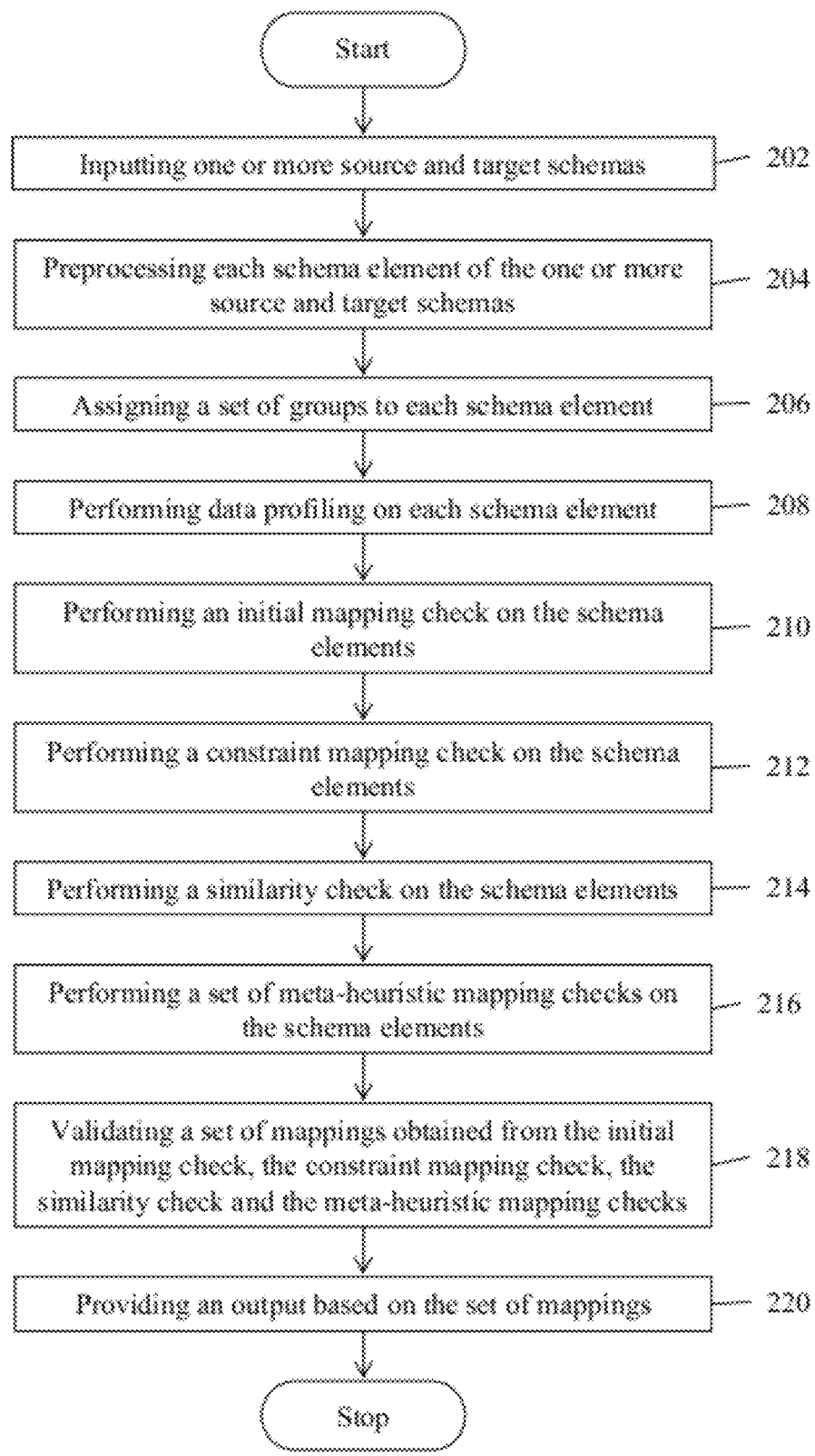
FIG. 2 illustrates a flowchart of a method for matching source and target schemas, in accordance with an embodiment of the present invention.

FIG. 2 illustrates a flowchart of a method for matching one or more source schemas to one or more target schemas, in accordance with an embodiment of the present invention.

At step 202, one or more source schemas and one or more target schemas, are taken as input, wherein each schema includes one or more schema elements. In an embodiment of the present invention, the source and target schemas are taken as input in a predefined format including a set of details. In an embodiment of the present invention, the predefined format is an Extensible Markup Language (XML) format. It will be apparent that the details may be collected in various compatible formats and need not be limited to the XML format. The set of details includes details corresponding to the schemas and their corresponding instances. Examples of the details collected include, but are not limited to, table names, column names, data types, data size, table definitions, column definitions, constraints defined on the columns like primary key, foreign key constraints, check constraints and alias names.

At step 204, each schema element is preprocessed. Preprocessing includes tokenization and validation. Tokenization includes identifying separate tokens for schema elements. For example, tokens P, O and Number are identified for a schema element PONumber. Validation includes expansion and elimination of the identified tokens, wherein the tokens representing abbreviations and acronyms such as P, O are expanded and redundant tokens such as tokens representing articles and prepositions are eliminated. The validation is performed using an information repository. In an embodiment of the present invention, the information repository includes one or more of, but not limited to, an inference based learning repository, a domain vocabulary, a word net, a thesaurus, a business glossary and a domain information repository.

At step 206, each preprocessed schema element is assigned to a set of groups, wherein a group includes at least one of a group and a sub-group of a group. In an embodiment of the present invention, the set of groups is assigned based on a group allocation check. For example, the group Address is assigned to the schema elements Addr1, Add2, Street, Street1, City and Country based on the group allocation check. The group allocation check includes identifying groups using the information repository. A schema element is not assigned to a set of groups when no group is identified for the schema element based on the group allocation check. For example, no group is assigned to a schema element Addcity when the group allocation check for Addcity provides no results.

At step 208, data profiling is performed on each schema element. Data profiling includes analyzing and processing instance data of the corresponding schema element and thereafter assigning a data profile from a data profiling category.

Various mapping checks are performed on the schema elements that are sorted into sets of groups. Each source schema element is mapped to a set of target schema elements and vice versa, wherein mapping checks are applied on the corresponding schema elements, i.e. mapping checks are applied on source schema elements and the corresponding set of target schema elements considered for mapping. After each mapping check, the set of target schema elements is updated, wherein the target schema elements, for which a mapping has been identified and validated, are eliminated from the set of target schema elements. The target schema elements that remain in the set of target schema elements are considered for further mapping checks. In addition, the mappings identified between the source schema elements and the target schema elements are stored in a set of mappings, which is updated after each mapping check.

At step 210, an initial mapping check is performed to identify pre-existing matches between schema elements. Pre-existing matches are identified based on the semantic similarity between the schema elements for which the check is performed and matches present in a list of past matches. Further, the identification depends on the number of times a pre-existing match is present in the list of past matches. In an embodiment of the present invention, the list of past matches is stored in the information repository and includes matches between schema elements identified in various mapping checks performed on different schemas.

The identified matches are validated based on instance data of the corresponding source and target schema elements. The instance data, hereinafter referred to as instance data or instance, represents an instance of a schema element. For example, the instance data for a schema element Address is A-101, Street 5, Sector 30, Noida. The pre-existing matches identified in the initial mapping check are used to update the set of mappings and the sets of target schema elements.

At step 212, a constraint mapping check is performed on the updated sets of target schema elements and the corresponding source schema elements. The constraint mapping check is performed to identify the relationship between constraints of the corresponding schema elements. Constraints represent the schema element constraints of schema elements such as primary key, foreign key, data range details, LIKE/IN constraints and so on. The schema elements with identical constraints are considered for mapping and are validated using the corresponding instance data. Thereafter, the set of mappings and the corresponding sets of target schema elements are updated accordingly.

One or more schema mapping checks are performed on the updated sets of target schema elements and corresponding source schema elements to identify the corresponding mappings.

At step 214, a similarity check is performed on the updated sets to identify semantic and syntactic similarity between the schema elements. Thereafter, the set of mappings and the corresponding sets of target schema elements are updated accordingly.

At step 216, a set of meta-heuristic mapping checks are performed on the updated sets to identify mappings between the source and target schemas. The set of meta-heuristic mapping checks includes one of, but not limited to, a genetic algorithm mapping approach and a genetic programming mapping approach. Thereafter, the set of mappings and the corresponding sets of target schema elements are updated accordingly.

The identified mappings are validated by comparing instance data of the corresponding schema elements. The set of mappings and the sets of target schema elements are updated based on the identified mappings at each mapping check.

The mappings between schema elements are one of, one to one mappings, one to many mappings, many to one mappings and many to many mappings. A one to one mapping represents the relation between one source schema element and one target schema element. For example, a source schema element Addlin1 is a one on one map to a target schema element Address Line 1. In an embodiment of the present invention, the similarity check is performed to identify one to one mappings between schema elements. A one to many mapping represents the relationship between one source schema element and a plurality of target schema elements. For example, a source schema element Customer Address is a one to many mapping to target schema elements CustAddLine1, CustAddLin2, CustAddCity and CustAddCountry. A many to one mapping represents the relationship between a plurality of source schema elements and one target schema element. A many to many mapping represents the relationship between a plurality of source schema elements and a plurality of target schema elements. For example, there is a many to many mapping between source schema elements Customer Address Street, Customer Address City, Customer Address Country and target schema elements CustAddLine1, CustAddLin2, CustAddCity and CustAddCountry. In an embodiment of the present invention, the set of meta-heuristic mapping checks are performed to identify one to one, one to many, many to one and many to many mappings between the source and target schema elements.

Further, a mapping can be a direct mapping or an equation based mapping. Example of a direct mapping is schema element1 being equal to schema element2. Example of an equation based mapping is:

$$\text{schema element1} = (\text{schema element2}) * (\text{schema element3}) + \text{schema element4}$$

A final set of mappings is created from the set of mappings identified after the one or more schema mapping checks.

At step 218, the final set of mappings is validated. In an embodiment of the present invention, the final set of mappings is validated by a Subject Matter Expert (SME). The validation is performed to confirm the accuracy of the final set of mappings obtained at step 216. In addition to validating the final set of mappings, a final check is performed to identify mappings between the remaining source and target schema elements. In an embodiment of the present invention, the final check is performed by the SME. Thereafter, the final set of mappings is updated based on the validation and the results obtained from the final check.

At step 220, the final set of mappings is provided as the output, wherein the output contains the matches between the source and target schemas. In an embodiment of the present invention, the final set of mappings is stored in the information repository. It will be apparent that updating the information repository with identified mappings helps in increasing the efficiency in subsequent matching of schemas.

Figure 3:
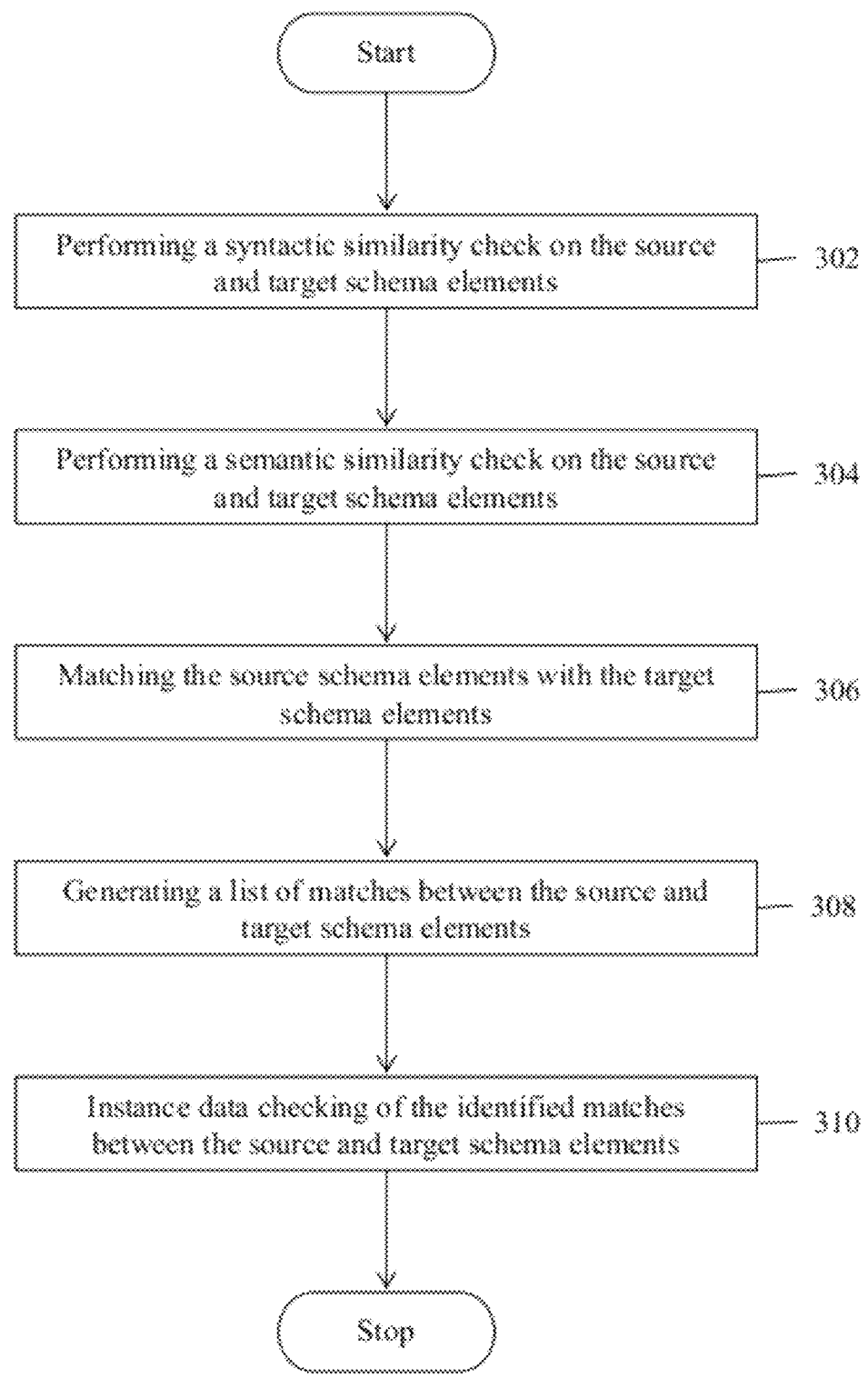
FIG. 3 illustrates a flowchart of a similarity check for matching source and target schemas, in accordance with an embodiment of the present invention.

FIG. 3 illustrates a flowchart of a similarity check for matching source and target schemas, in accordance with an embodiment of the present invention.

The updated sets of target schema elements and the corresponding source schema elements are considered for the similarity check. The similarity check is performed on each schema element. The similarity check is performed on schema elements of each group of the set of groups. Further, element wise similarity check is performed for each source and target schema elements that are not assigned groups. The element wise similarity check includes checking the similarity of each source schema element with each of the target schema elements. Further, the element wise similarity check is performed in between schema elements including identical constraints.

The similarity check is performed to evaluate the syntactic and semantic similarity between the source and the target schema elements. A similarity value is calculated based on the similarity check. In an embodiment of the present invention, the similarity value is in the range of 0 to 1, wherein 0 is the similarity value between two unrelated schema elements and 1 represents the similarity value of identical schema elements.

At step 302, a syntactic similarity check is performed to calculate a syntactic similarity value between the source and target schema elements. The syntactic similarity check is performed to identify the degree of syntactic similarity between the schema elements. In an embodiment of the present invention, the syntactic similarity is the similarity between schema elements in terms of syntactic function and role. The syntactic similarity value represents the degree of syntactic similarity between the source and target schema element. In an embodiment of the present invention, the syntactic similarity value is in the range of 0 to 1, wherein 0 represents the syntactic value for two unrelated schema elements and 1 represents an exact match between two schema elements.

In an embodiment of the present invention, one or more techniques are used for performing the syntactic similarity check. The one or more techniques include, but are not limited to prefix, suffix and edit distance checks. Similarity values are obtained from each of the one or more techniques. Thereafter, the syntactic similarity value is calculated by taking a weighted average of the similarity values obtained from the one or more techniques.

At step 304, a semantic similarity check is performed to calculate a semantic similarity value between the source and the target schema elements. The semantic similarity check includes identifying the similarity between the linguistic meaning of the source and target schema elements. The semantic similarity value represents the degree of semantic similarity between the source and target schema elements. In an embodiment of the present invention, the semantic similarity value is in the range of 0 to 1. The semantic similarity check is performed using the information repository. In an exemplary embodiment of the present invention, the semantic similarity check is performed using standard metrics such as Resnik, Lin, Jiang etc.

The weighted average of the syntactic and semantic similarity value provides the similarity value between the source and target schema elements. A set of similarity values is obtained based on the similarity check. The set of similarity values for each target schema element includes the similarity values between the target schema element and the corresponding source schema elements. Similarly, for each source schema element the set of similarity values includes the similarity values between the source schema element and the corresponding target schema elements.

At step 306, the target schema elements are matched to the source schema elements. For each target schema element, the matching is performed based on the corresponding set of similarity values. The highest similarity value in the set of similarity values is identified and the corresponding source schema element is considered to be the matching source schema element. It will be apparent that there can be one or more matching schema elements.

At step 308, a list of matching source and target schema elements is obtained based on the similarity value. The matches identified are one of, but not limited to, an exact match, a highly liked match, a potential match and a non-match.

The matches are classified based on the similarity value for one or more domains, but not limited to, ecommerce, mobile banking etc. The matches are classified under different categories such as exact matches, highly liked matches, potential matches, and non-matches based on the calculated similarity values.

In an exemplary embodiment of the present invention, for a particular domain, if the similarity value is greater than or equal to a 'predetermined exact match threshold value', then the match is classified as an exact match. For example, if the 'predetermined exact match threshold value' is 0.98, then for each set of target schema elements corresponding to source schema elements, the target schema elements with 98% or more similarity to the corresponding source schema elements may be classified as exact matches. The 'predetermined exact match threshold value' is decided based on the domain. For example, for internet banking domains the 'predetermined exact match threshold value' may be 0.98. Alternately, for mobile based networking applications, the 'predetermined exact match threshold value' may be 0.94. Further, the matches for which the similarity value is greater than or equal to the 'predetermined exact match threshold value' and less than or equal to the maximum similarity value, are considered exact matches. For example, matches for which the similarity value is in between 0.98 and 1 may be considered exact matches, i.e. a variance of 0 to 0.02 in the allowable range of values may be considered for classifying a match as an exact match. The set of mappings is updated with the exact matches and the corresponding sets of target schema elements are updated accordingly.

Similarly, highly liked matches are the matches for which the similarity values between schema elements is greater than or equal to a 'predetermined highly liked match threshold value' and is less than the 'predetermined exact match threshold value'. For example, matches for which the similarity is in the range of 80% to 98%, i.e. the similarity value is in the range of 0.80 to 0.98. Accordingly, for highly liked matches, the variance in the allowable range of values is between 0.02 (i.e. 1—the 'predetermined exact match threshold value') and 0.20 (i.e. 1—the 'predetermined highly liked match threshold value'). However, the variance in the allowable range of values varies from one domain to another domain.

Similarly, the matches for which the similarity is greater than or equal to a 'predetermined potential match threshold value' and less than the 'predetermined highly liked match threshold value', may be considered potential matches. For example, the matches for which the similarity is in the range of 50% to 80%, i.e. the similarity value in the range of 0.50 to 0.80, and with variance between 0.20 (1—the 'predetermined highly liked matches threshold value') and 0.50 (1—the 'predetermined potential match threshold value'), may be considered as potential matches. Further, the variance values may vary between domains.

Further, the matches for which the similarity between schema elements is less than the 'predetermined potential match threshold value' may be considered non-matches. For example, the matches with similarity value less than 50%, i.e. the similarity value is less than 0.50, may be considered as non-matches. Various mapping checks are performed on highly liked, potential and non-matches to identify probable mappings between the schema elements. The sets of target schema elements are updated based on the identified exact, highly liked, potential and non-matches.

It will be apparent that the condition for categorizing matches into exact matches, highly liked matches, potential matches and non-matches need not be limited to that illustrated above and numerous other permutations and combinations may be applied for categorizing the matches. Further, the categorization of matches need not be limited to that illustrated above, and numerous variations will be apparent to those skilled in the art.

At step 310, instance data check is performed on the identified highly liked and potential matches. The corresponding matches are validated based on instance data of the corresponding schema elements. Instance data check includes comparing a plurality of instances of the source schema element to a plurality of instances of the target schema element. Thereafter, the set of mappings and the sets of target schema elements are updated accordingly.

Figure 4A:
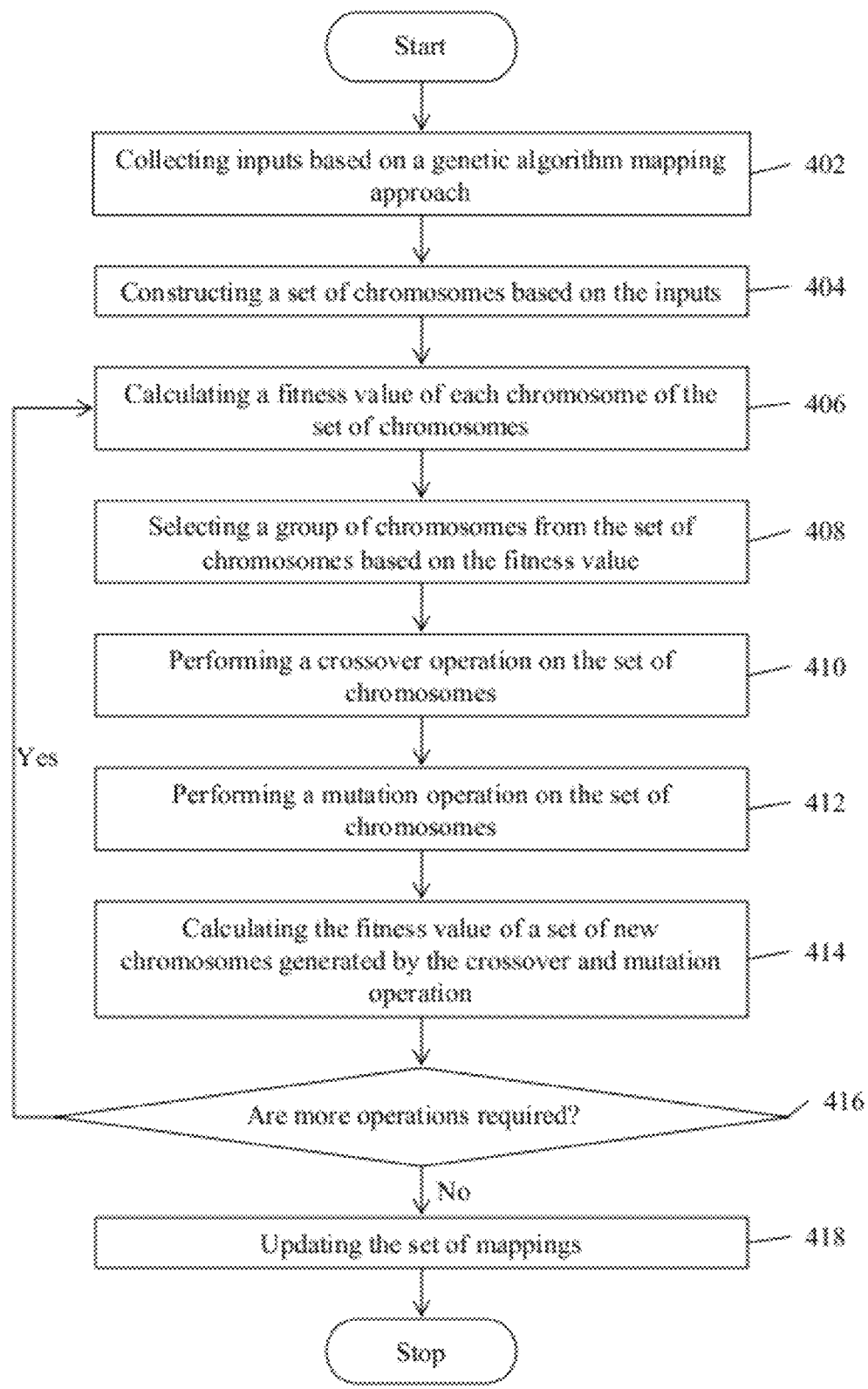
FIG. 4A illustrates a flowchart of a meta-heuristic mapping check, in accordance with an embodiment of the present invention.

FIG. 4A illustrates a flowchart of a meta-heuristic mapping check, in accordance with an embodiment of the present invention.

The updated sets of target schema elements and the corresponding source schema elements are considered for the meta-heuristic mapping check. Further, the updated sets of target schema elements include schema elements for which mappings have not been identified. In accordance with this embodiment, the meta-heuristic mapping check includes the genetic algorithm mapping approach.

At step 402, inputs are collected. The inputs include the set of source schema elements, updated sets of target schema elements, a set of instance equations, a set of configuration parameters and instance data of the corresponding source and target schema elements. In various embodiments of the present invention, the set of instance equations are exemplary equations, which represent a probable mapping between source and target schema elements. Further, these equations are used to arrive at the actual mapping after mapping schema elements have been identified. The set of configuration parameters are the parameters required based on the genetic algorithm mapping approach. These parameters include, but are not limited to, mutation probability, crossover probability, population size and number of generations.

At step 404, a set of chromosomes are constructed from the source and target schema elements, wherein each chromosome of the set of chromosomes represents a match between schema elements of source and target schemas. In an embodiment of the present invention, the set of chromosomes includes P chromosomes. In an embodiment of the present invention, q target schema elements and p source schema elements are selected for constructing a chromosome of length p+q+1. The value of 'p' and 'q' are determined based on the number of operands in the instance equation.

In an embodiment of the present invention, the selection of schema elements for constructing chromosomes is based on one or more of, but not limited to, random selection strategy, neighborhood selection strategy and similarity values between source and target schema elements.

The schema elements are encoded in a predefined format to construct the chromosome. In an embodiment of the present invention, a string of integers to indicate the selection of relevant schema elements is used for encoding. For example, a chromosome C={9 2 3 1 2 5}, constructed by using integers, indicates that 9 is the instance equation index, 2 and 3 that correspond to target schema element indexes selected from a set of target schema elements T and similarly 1, 2 and 5 represent the source elements indexes selected from a set of source schema elements S. The first element of the chromosome references to the instance equation between the corresponding schema elements. Example of an instance equation is y1+y2=x1+x2+x3, wherein y1 and y2 are target schema elements and x1, x2 and x3 are source schema elements.

Figure 4B:
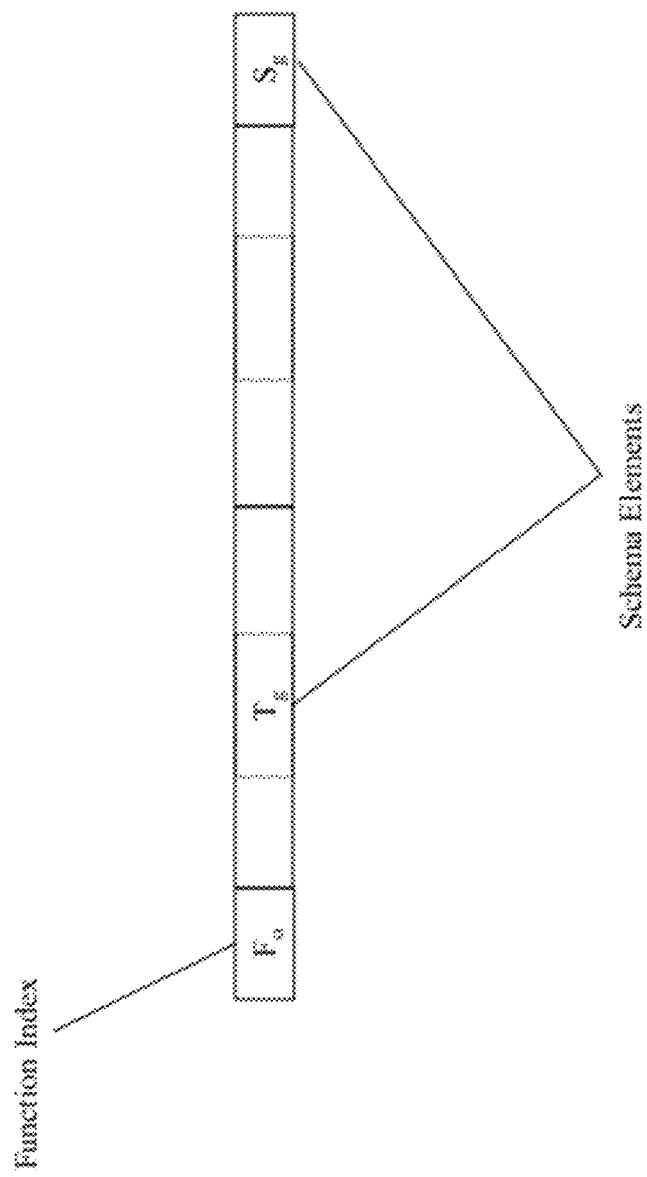
FIG. 4B illustrates a chromosome, in accordance with an exemplary embodiment of the present invention.

An exemplary encoding of a chromosome is illustrated in FIG. 4B. The chromosome includes $F_o$ that represents operators and rules depicting the relation between the schema elements. The chromosome further includes one or more elements $T_g$ and $S_g$ corresponding to the target and source schema elements.

At step 406, a fitness value is calculated for each chromosome of the set of mapping chromosomes. The fitness value of a chromosome represents the degree of match between the selected source and target schema elements. In an embodiment of the present invention, the fitness value is calculated based on instance data check of the selected schema elements.

The fitness value represents the similarity value between the selected source and target schema elements. In an embodiment of the present invention, the fitness value is in the range of 0 to 1, wherein 0 represents that the selected schema elements are not related and 1 represents that the selected schema elements are identical. The chromosomes with a fitness value of 1 are considered to include schema elements with exact matching. The calculation is performed based on the relationship between the selected schema elements. The identification of the relationships is based on the constraint relationships between the schema elements; the mappings identified in the similarity check and predefined mapping relationships. Examples of predefined mapping relationships include mapping relationships specified by a user.

The chromosomes with the fitness value above a threshold value are saved in a set of mapping chromosomes. In various embodiments of the present invention, the threshold value can be configured for selecting chromosomes with a desired level of fitness value. The chromosomes with fitness value higher than the threshold value are referred to as best fit chromosomes and are retained in the set of mapping chromosomes.

At step 408, a group of chromosomes is selected from the set of chromosomes based on the fitness value of each chromosome. In an embodiment of the present invention, the selection is performed based on, but not limited to random selection method, and Roulette wheel selection method.

At step 410, a crossover operation is performed on the set of chromosomes. The crossover operation randomly inputs two chromosomes from the set of chromosomes. Thereafter, a random number between 0 and 1 is generated. The value of the generated random number is compared with a predefined crossover probability value. In an embodiment of the present invention, the predefined crossover probability value is 0.98. If the value of the generated random number is less than the predefined crossover probability value, a swapping operation is performed, wherein one or more sub-strings are swapped between the two chromosomes to obtain a new chromosome, which is inserted in a set of new chromosomes.

If the value of the generated random number is greater than the predefined crossover probability value, the crossover operation is not performed and two other chromosomes are randomly selected from the set of chromosomes. The crossover operation is repeated till a predefined number of chromosomes are generated. In an embodiment of the present invention, the predefined number of chromosomes is P.

At step 412, a mutation operation is performed. The mutation operation is performed on chromosomes obtained from the crossover operation. The mutation operation includes generation of random number (RN1). The value of RN1 is compared with a predefined mutation operation probability value (PMO). In an embodiment of present invention, PMO is 0.01. If the value of RN1 is less than or equal to PMO, then another random number (RN2) is generated. The value of RN2 is compared with a predefined target element mutation probability value (PTEM). If the value of RN2 is less than or equal to a predefined target element mutation probability value (PTEM), one of the target schema elements in the chromosome is randomly substituted with a target element selected from the set of target elements. If the value of RN2 is greater than PTEM, one of the source elements in the chromosome is randomly substituted with a source schema elements selected from the one of more source schema elements. If the value of RN1 is greater than PMO, the mutation operation is not performed on the chromosome. The mutation operation is performed on each chromosome of the set of new chromosomes.

At step 414, the fitness value for each chromosome of the set of new chromosomes is calculated. The chromosomes with fitness value higher than the threshold fitness value in the set of new chromosomes are saved in the set of mapping chromosomes. The crossover and mutation operation are performed iteratively on the set of new chromosomes. In each iteration the best fit chromosomes are saved and the set of mapping chromosomes is updated with the best fit chromosomes.

At step 416, a check is performed to determine whether more operations based on the genetic programming approach need to be performed to identify mappings between source and target schemas. In an embodiment of the present invention, the check is performed to identify whether a predetermined number of iterations have been performed, wherein each iteration one or more steps from 406 to 414 are performed. In another embodiment of the present invention, the check is performed to identify whether a predefined number of mapping chromosomes have been identified.

At step 418, the set of mappings is updated based on the set of mapping chromosomes. In an embodiment of the present invention, the SME validates and accordingly updates the set of mappings. Further, the corresponding sets of target schema elements are updated based on the set of mapping chromosomes.

Figure 5A:
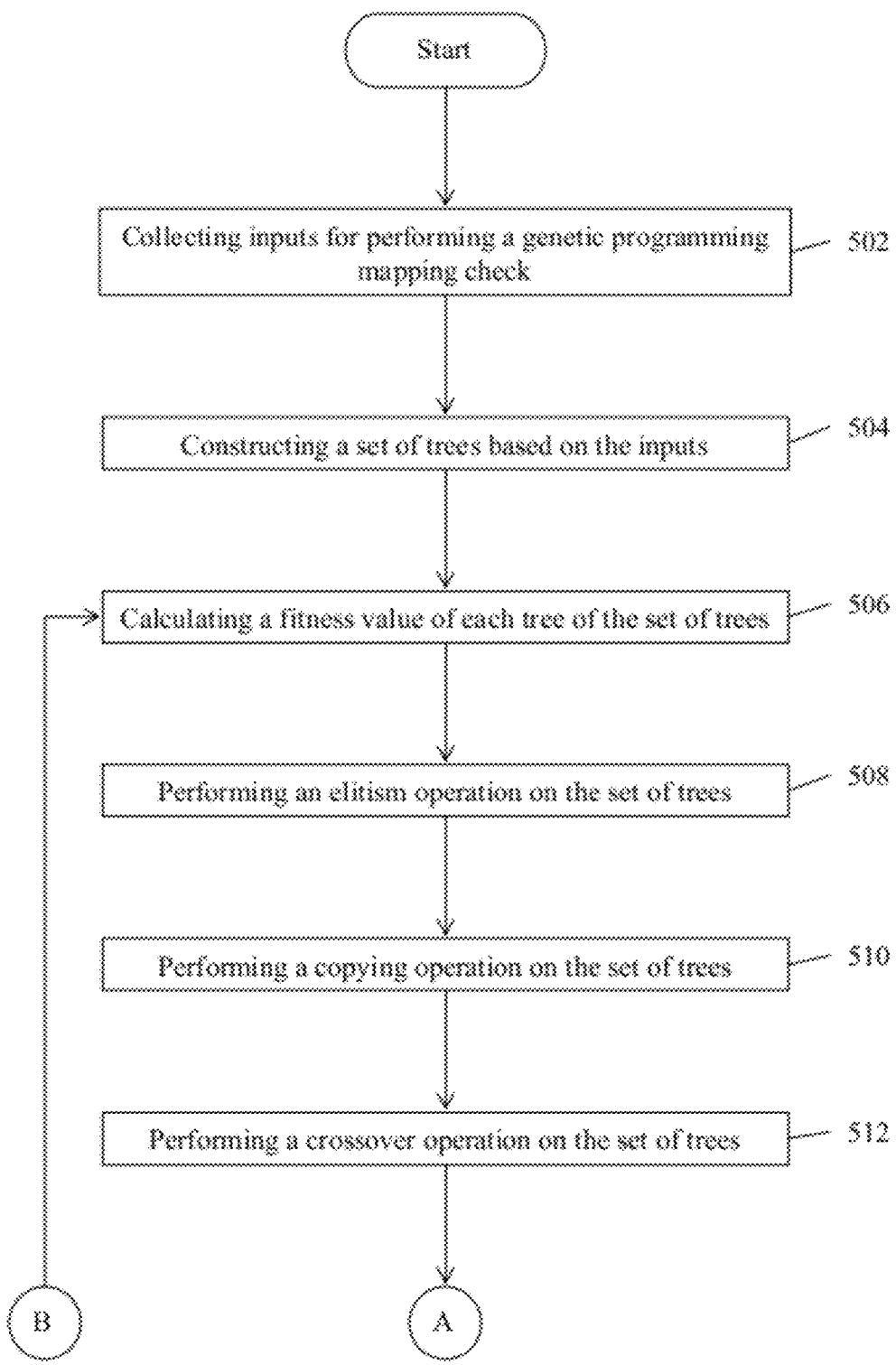
FIG. 5A illustrates a flowchart of a meta-heuristic mapping check, in accordance with another embodiment of the present invention.
Figure 5A:
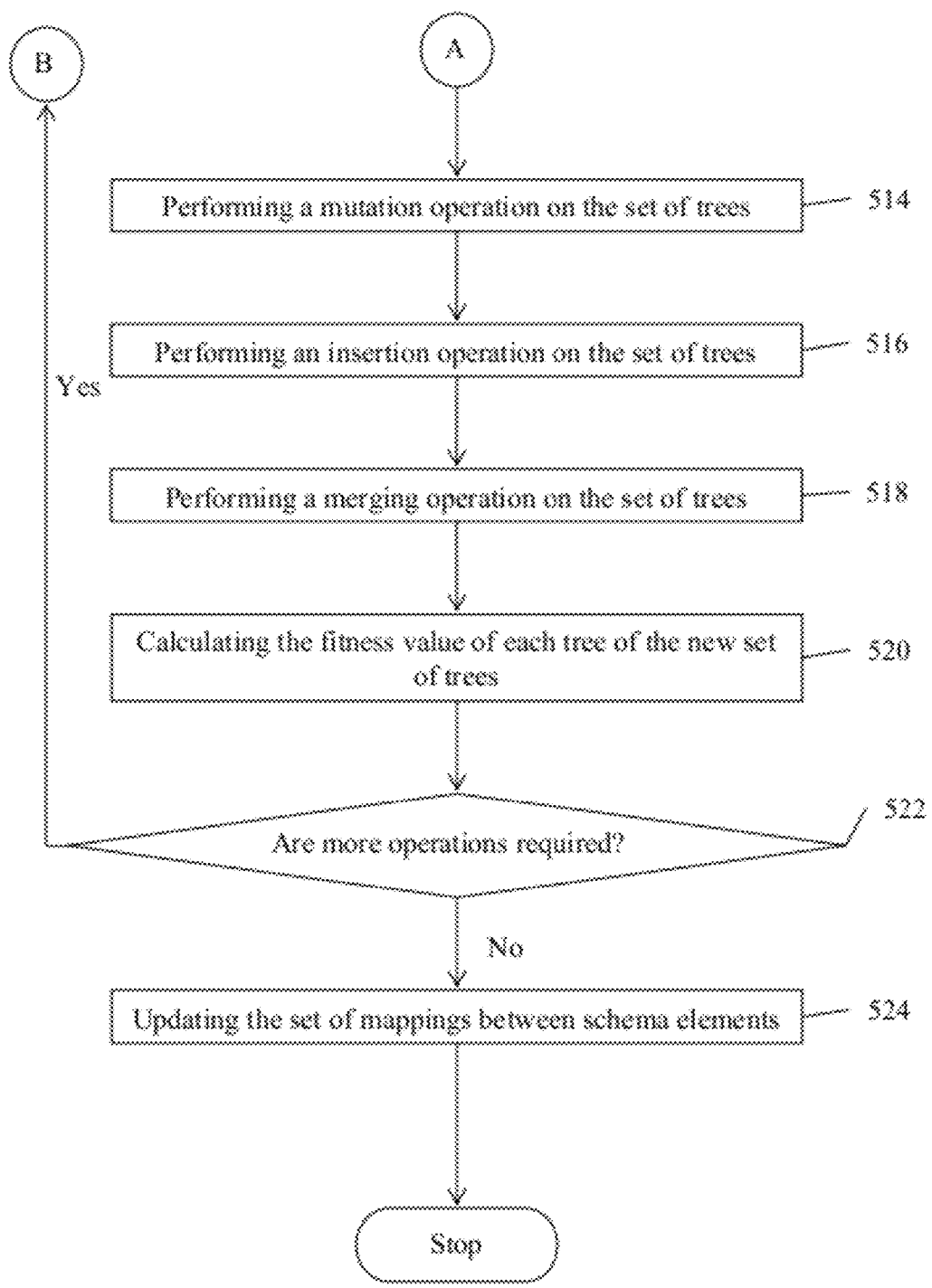

FIG. 5A illustrates a flowchart of a meta-heuristic mapping check, in accordance with another embodiment of the present invention.

The updated sets of target schema elements and the source schema element are considered for the meta-heuristic mapping check. Further, the updated sets of target schema elements include schema elements for which mappings have not been identified. In accordance with this embodiment, the meta-heuristic mapping check includes the genetic programming mapping approach. The genetic programming mapping approach is adapted subsequent to the genetic algorithm mapping approach.

At step 502, inputs are collected. The inputs include the source and target schema elements, a set of operators, a set of configuration parameters and instance data of the source and target schema elements. In an embodiment of the present invention, the set of operators includes mathematical and functional operators. Examples of the mathematical operators include, but are not limited to, addition operator (+), subtraction operator (−), multiplication operator (*) and division operator (/). Examples of the functional operators include, but are not limited to, IF, THEN and concat. The set of configuration parameters are the parameters required for the genetic programming mapping approach. These parameters include, but are not limited to, mutation probability, crossover probability, population size and number of generations.

At step 504, a set of trees are constructed. Each tree of the set of trees is constructed by randomly selecting schema elements and one or more operators from the set of operators. Each tree is a collection of nodes, wherein each node is at least one of a schema element, an operator and a mapping node. The schema element is either a selected source or target schema element. The operator is one of the set of operators. The mapping node separates the source schema elements and the target schema elements within the tree. In an embodiment of the present invention, the mapping node is a root node of the tree. Further, the collections of nodes separated by the root node are referred to as children of the root node.

Figure 5B:
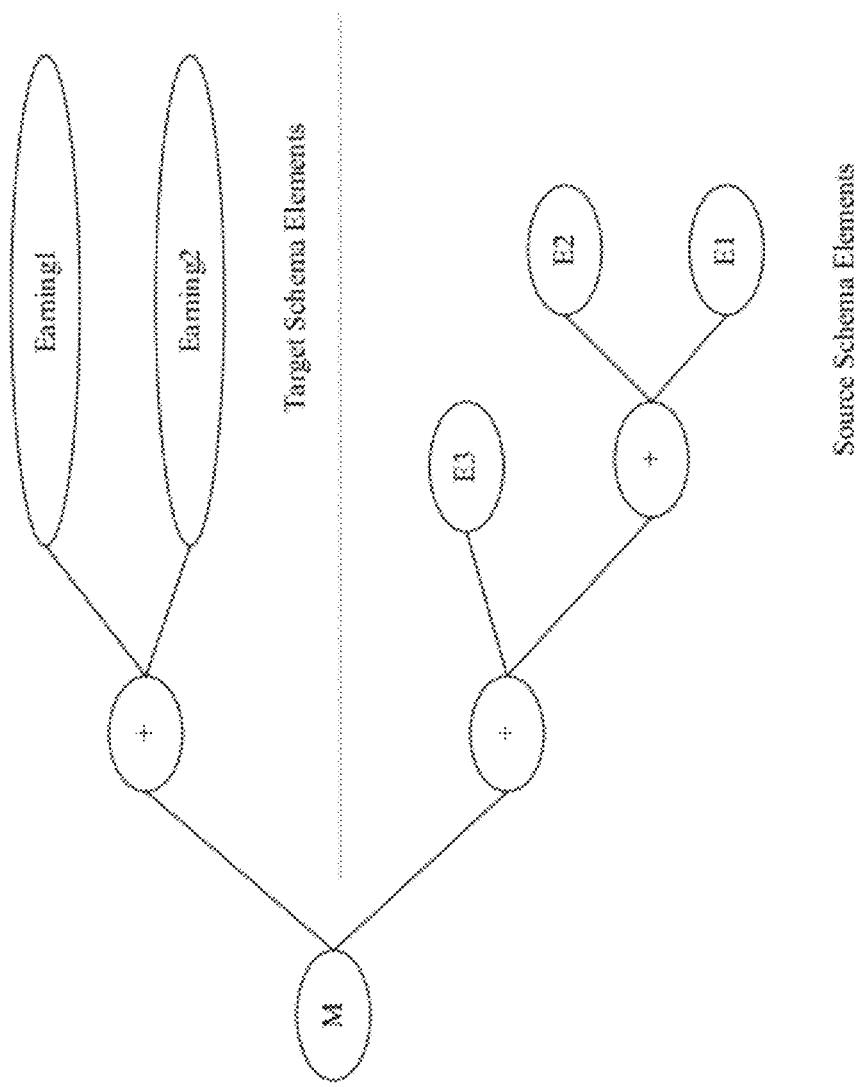
FIG. 5B illustrates a tree, in accordance with an exemplary embodiment of the present invention.

An exemplary tree is illustrated in FIG. 5B. The tree includes nodes corresponding to source schema elements such as E1, E2 and E3, nodes corresponding to target schema elements such as Earning1 and Earning 2, nodes corresponding to the operators such as the addition operator and mapping nodes such as node M.

In an embodiment of the present invention, the selection of schema elements and the operators is performed based on a set of predefined conditions. The set of predefined conditions are conditions for enabling the selection of similar schema elements and suitable operators, such as, but not limited to, random selection strategy, neighborhood selection strategy, similarity values between source and target schema elements are considered for constructing the trees. In an embodiment of the present invention, the set of trees includes Q trees, wherein each tree of the set of trees represents a match. Further, the match is between one or more source and target schema elements.

At step 506, a fitness value for each tree is calculated. The fitness value for a tree represents the degree of match between the source and target schema elements within the tree. In an embodiment of the present invention, a fitness value of 1 indicates that there is an exact match between the source and target schema elements of the tree and a fitness value of 0 indicates that there is no match between the source and target schema elements of the tree.

The fitness value for each tree is calculated based on the instance data of the corresponding schema elements. The calculation of the fitness value is performed based on one or more fitness functions.

In an embodiment of the present invention, the fitness value is calculated based on frequency of matches. The fitness value is equal to the ratio of the number of correct matches to the total number of selected instances.

In another embodiment of the present invention, the fitness value is calculated based on mean squared error. The fitness value is calculated using the following equation:

$$FV = 1/(1+MSE);$$

wherein, FV is the fitness value and MSE is the mean squared error provided by the following equation:

$$MSE = \frac{1}{N} \sum_{i=1}^{N} (S_i^{in} - t_i^{in})^2;$$

wherein, $S_i^{in}$, $t_i^{in}$ are the ith source schema element and ith target schema element instance respectively.

In yet another embodiment of the present invention, the fitness value is calculated based on Relative Squared Error (RSE). The fitness value is calculated using the following equation:

$$FV=1/(1+RSE).$$

In yet another embodiment of the present invention, the fitness value is calculated based on Squared Difference Error (SDE). The fitness value is calculated based on the following equation:

$$FV=1/(1+SDE).$$

In yet another embodiment of the present invention, the fitness value is calculated based on Kullback Liebler (KL) divergence. The fitness value is calculated using the following equation:

$$FV=1/(1+KLD).$$

A group of trees are selected from the created set of trees based on the fitness values. In an embodiment of the present invention, the trees selected are the trees with a fitness value higher than a threshold fitness value. The trees in the group of trees indicate a match between the source and target schema elements of the corresponding trees. A solution set of trees is created based on the group of trees, wherein the each tree of the solution set of trees has a fitness value greater than a solution threshold fitness value.

One or more operations are performed on the set of trees to generate a new set of trees. In an embodiment of the present invention, the trees from the group of trees are used for generating the new set of trees. The one or more operations include, but are not limited to, elitism, copying, crossover, mutation, insertion and merging.

At step 508, the elitism operation is performed to retain the trees with the best fitness value from the group of trees. The operation includes identifying the trees with a fitness value above a predefined match fitness value. The identified trees are added to the solution set of trees. Further, the identified trees are added to the new set of trees. It would be appreciated that this operation increases the probability of retaining the significant matches, in other words the best matches.

At step 510, the copying operation is performed to retain probable matches. The trees with a fitness value above a predefined probabilistic match fitness value are copied to the new set of trees.

At step 512, the crossover operation is performed to generate new trees to be added to the new set of trees. In the crossover operation, two trees are selected from the group of trees. Thereafter, a random number is generated. If the value of the generated random number is less than a predefined crossover probability value, one or more nodes are swapped between the two trees. If the value of the generated random number is greater than the predefined crossover probability value, the crossover operation is not performed. The new chromosomes generated are added to the new set of trees.

At step 514, the mutation operation is performed to generate new trees to be added to the new set of trees. The mutation operation is performed on trees from the set of trees. The operation includes generating a random number. If the value of the generated random number is less than a predefined mutation probability value (0.01), one or more nodes of the tree are replaced by a set of nodes that are randomly selected from the set of available nodes. In an embodiment of the present invention, the one or more nodes are replaced by nodes having a similar type. For example, a node for an operator + is replaced by a node of a different operator *. If the value of the generated random number is greater than the predefined mutation probability value, the mutation operation is not performed. The new trees obtained by the mutation operation are added to the new set of trees.

At step 516, an insertion operation is performed. The insertion operation includes inserting one or more nodes such as schema element nodes, operator nodes, mapping nodes etc, into a tree, thereby generating new trees. The new trees obtained from the insertion operation are added to the new set of trees.

At step 518, a merging operation is performed. The merging operation includes combining two or more trees from the set of trees into one tree. The new trees obtained from the merging operation are added to the new set of trees. In an embodiment of the present invention, the trees to be merged are selected randomly. In another embodiment of the present invention, the trees to be merged are selected based on the Roulette wheel selection method. In an exemplary embodiment of the present invention, the merging operation includes replacing one or more nodes of one tree with one or more nodes of another tree. For example, the right-most leaf node of an existing tree is selected for replacement and in the merging operation the selected right-most leaf node is replaced with a sub-tree of a randomly selected tree.

In an embodiment of the present invention, the one or more operations are performed based on a set of operational strategies. The set of operational strategies include, but are not limited to, a neighborhood selection strategy, an operator node selection strategy and a look-ahead search strategy.

In various embodiments of the present invention, a set of heuristics are applied during the generation of new trees. The set of heuristics are applied for at least one of, but not limited to, limiting the depth of the mapping trees that are randomly generated, limiting the numbers of operators that are used and limiting the use of operators based on the data type. In an exemplary embodiment of the present invention, the set of heuristics comprises the neighborhood selection strategy and the operator node selection strategy, which are applied to limit the search space and choice of operators based on data type. For example, arithmetic operators like '+', '−', '/' and '*' are applied to schema elements of numeric/integer type and operators like 'concat', 'substring' are applied for string typed columns.

The neighborhood selection strategy is performed to enhance the probability of selection of logically related schema elements for the construction of trees. A schema includes schema elements that are related by tags and sub-tags. For example, the fields corresponding to address such as line1, line2, street and city are grouped under one tag. Similarly, the schema S={empid, lname, fname, mname, ext, email, reportsTo, jobTitle} has a logical ordering of 'id', 'name', 'contact' and 'job info'. In the strategy, when a schema element is selected for tree construction, a higher selection probability is assigned to the logically related schema element, thereby enabling the grouping of logically related schema elements in a tree. For example, when fname is picked from schema S as first element for the tree, the next element is chosen by giving higher probability to the logically related elements mname and lname. It would be appreciated that this strategy enables faster convergence as the search is guided in the direction of potential match.

The operator node selection strategy is performed to enhance the probability of selection of logically applicable operators. The logically applicable operators are the operators that are considered applicable for tree construction based on the frequency of use of the operators in tree construction. For example, an addition (+) operator is considered a logically applicable operator, whereas a multiplication (*) operator is not considered a logically applicable operator as the frequency of use of the + operator is significantly higher than the * operator. In the operator node selection strategy, the logically applicable operators are assigned a higher selection probability value than the operators that are not logically applicable, thereby enhancing the probability of selection of the logically applicable operators.

The look-ahead search strategy is adapted to reduce the time required for identifying potential tree matches, wherein a potential tree match represents a tree with matching source and target schema elements. The look-ahead search strategy is adapted at the end of each iteration. In the look-ahead search strategy, one or more nodes are added to the tree to identify potential tree matches. For example, a schema match T:Earnings=S:Salary+HRA+DA can be identified while evaluating a tree T:Earnings=S:Salary+HRA, wherein T:Earnings represents a target schema element and S:Salary, HRA and DA represent corresponding source schema elements. Similarly, a schema match T:Price=S:Qty*UnitPrice*80%, can be identified while evaluating the tree T:Price=S:Qty*UnitPrice, wherein T:Price represents a target schema element and S:Qty, UnitPrice represents the corresponding source schema element.

In an embodiment of the present invention, an offset value is calculated for each tree based on the instance data of the target element to identify a potential tree match. The offset value is one of a constant and value of a source schema element, such as the value of DA in the above example. If the calculated offset value is constant, then it is considered that the addition of the one or more nodes provides a potential tree match. However, if the offset value is not a constant, one or more source schema elements are selected. In an embodiment, the selection of the source schema elements is performed based on estimated mean and variance values. The estimated mean and variance values represent the difference of values between the instances used.

At step 520, the fitness value for each tree in the new set of trees is calculated and the group of trees is updated based on the fitness value of the trees in the new set of trees.

At step 522, a check is performed to determine if more operations based on the genetic programming mapping approach need to be performed. In an embodiment of the present invention, the check is performed to identify if a predetermined number of iterations have been performed, wherein each iteration one or more steps from 506 to 516 are performed. In another embodiment of the present invention, the check is performed to determine if any match has been identified.

At step 524, the set of mappings is updated based on the solution set of trees. In an embodiment of the present invention, the SME validates the solution set of trees prior to the update of the set of mappings.

Figure 6A:
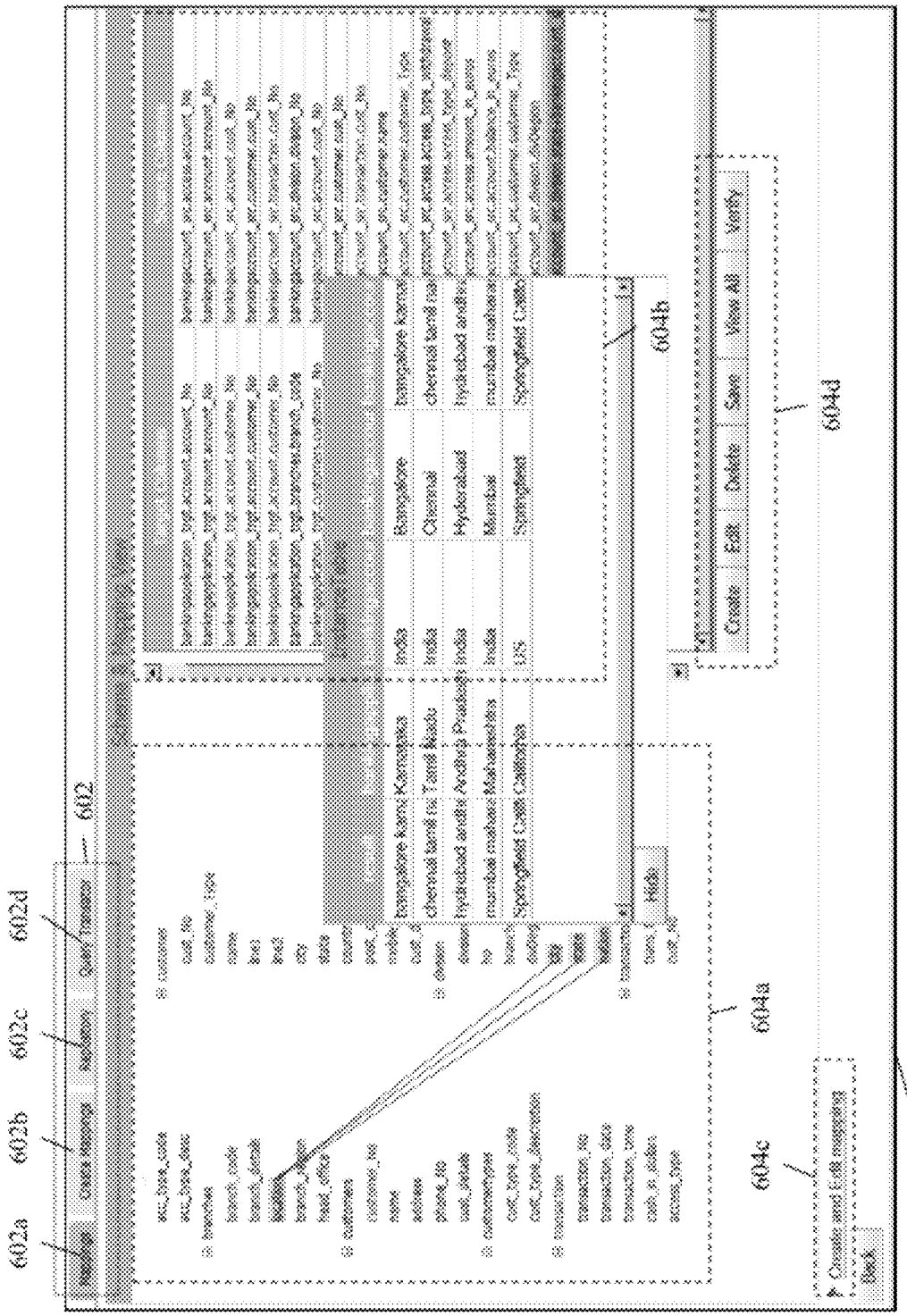
FIGS. 6A-6C illustrate exemplary snapshots of the system for matching the source and target schemas.
Figure 6B:
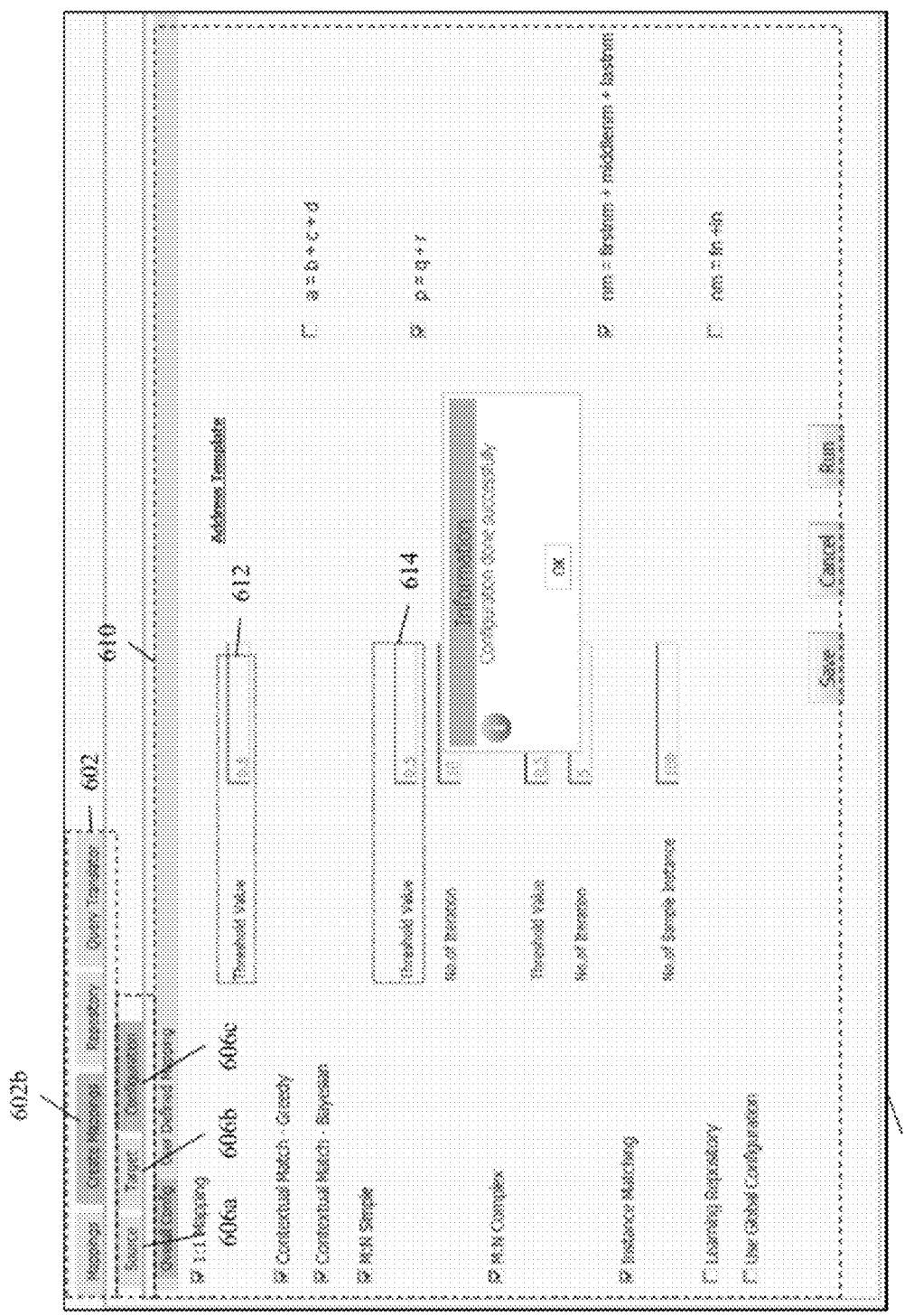
Figure 6C:
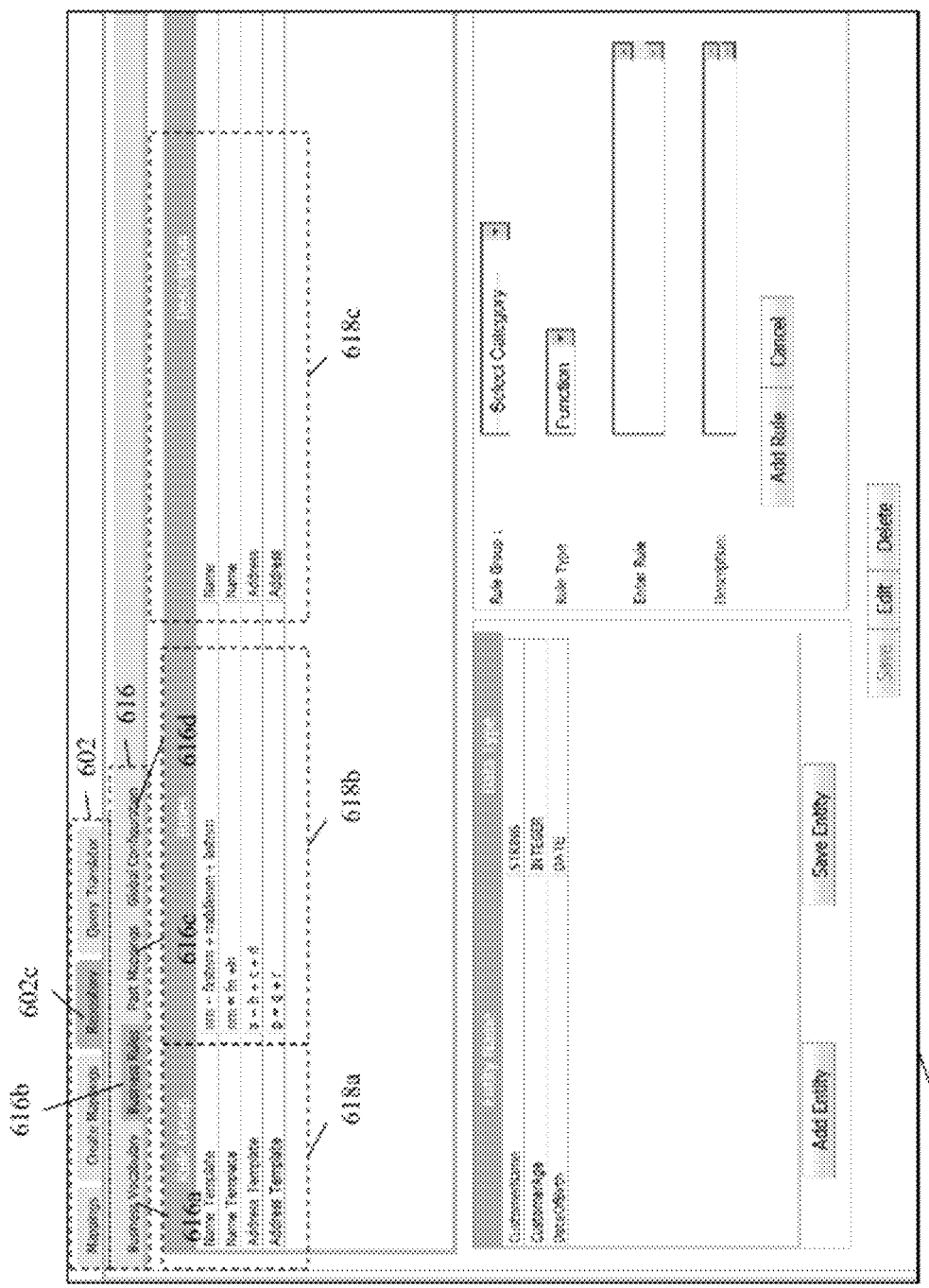

FIGS. 6A-6C illustrate exemplary snapshots of the system for matching the source and target schemas.

FIG. 6A illustrates a snapshot depicting an admin view 600 of the system. Admin view 600 is the view provided to an administrator after the administrator has logged on to the system. Admin view 600 enables the administrator to view one or more tabs 602 such as a mappings tab 602a, a create mappings tab 602b, a repository tab 602c, a query translator tab 602d and so on. The selection of a tab from one or more tabs 602 displays the corresponding sections to the administrator. Each of the corresponding section can be used by the administrator to view, modify and update details related to the source and target schemas. For example, when the administrator selects mappings tab 602a the screen provides the administrator with one or more sections 604 such as a mapping section 604a, a schema section 604b, a create and edit mapping section 604c, a modify section 604d and so on.

Each of the one or more sections provides specific information about the source and target schemas and the corresponding mappings. For example, mapping section 604a displays the mapping between source and target schema elements in a tree format, schema section 604b displays source and target columns and their corresponding mappings in the form of equation in a tabular format and so forth.

FIG. 6B illustrates another snapshot of admin view 600 of the system when create mappings tab 602b is selected. The selection provides the administrator to view one or more sub-tabs 606 such as a source sub-tab 606a, a target sub-tab 606b and a configuration sub-tab 606c. The selection of a sub-tab of one or more sub-tabs 606 displays the corresponding sections. For example, when the administrator selects configuration sub-tab 606c, the selection displays one or more sections 608 (not illustrated in FIG. 6B) such as an internal tab section 610. Each of one or more sections 608 enables the administrator to use the options provided by the corresponding section. For example, internal tab section 610 enables the administrator to view and adjust overall configuration by modifying a set of available configuration details such as 1:1 mapping threshold value 612, M:N simple threshold value 614 and so on.

FIG. 6C illustrates yet another snapshot of admin view 600 when repository tab 602c is selected. The selection displays one or more internal tabs 616, such as a business vocabulary tab 616a, a business rules tab 616b, a past mappings tab 616c and a global configuration tab 616d and the corresponding sections. For example, when business rules tab 616b is selected one or more sections 618 such as a rule group section 618a, a rule section 618b and a description section 618c are displayed. It will be apparent that the number of views and options provided by the system is much more than those depicted by the exemplary snapshots.

While the exemplary embodiments of the present invention are described and illustrated herein, it will be appreciated that they are merely illustrative. It will be understood by those skilled in the art that various modifications in form and detail may be made therein without departing from or offending the spirit and scope of the present invention as defined by the appended claims.

What is claimed is:

1. A system for matching one or more source schemas with one or more target schemas, the system comprising:
    an input module configured to receive inputs pertaining to the one or more source and target schemas in a predefined format;
    a processing module comprising a processor configured to process the received inputs by comparing the one or more source schemas with the one or more target schemas to identify a set of matches based on linguistic similarity, structural similarity, functional similarity and relationships between the source and target schemas wherein matches between the source and target schemas are identified by a genetic algorithm mapping approach comprising:
        constructing a set of chromosomes for matching the source and target schemas, wherein each chromosome represents a match between at least one source schema element and at least one target schema element;
        performing a crossover operation on one or more chromosomes of the set of chromosomes, wherein the crossover operation comprises selecting two chromosomes and interchanging of schema elements between the two chromosomes based on predefined conditions;

performing a mutation operation on one or more chromosomes of the set of chromosomes, wherein the mutation operation comprises modifying each chromosome based on predefined conditions; and identifying matches between the source and target schemas based on fitness values of the constructed set of chromosomes and fitness values of chromosomes obtained from crossover and mutation operations; and an information repository comprising a memory configured to store the identified set of matches.

2. The system of claim 1, wherein the processing module comprises a preprocessing module configured to update the received inputs, the received inputs being updated by:

tokenizing one or more schema elements of the source and target schemas; validating the tokenized schema elements; and assigning each validated schema element to one or more groups based on a predefined criteria.

3. The system of claim 1, wherein the processing module comprises a data profiling module configured to:

analyze and process instance values of one or more schema elements of the source and target schemas; and categorize the analyzed schema elements into one or more data profile categories.

4. The system of claim 1, wherein the processing module comprises a past match checking module configured to identify matches between the source and target schemas based on predetermined mappings between pre-existing source and target schemas.

5. The system of claim 1, wherein the processing module comprises a constraint mapping module configured to identify relationships between the source and target schemas.

6. The system of claim 1, wherein the processing module comprises a similarity checking module configured to identify matches between the source and target schemas based on linguistic similarity, structural similarity, functional similarity and relationships between the source and target schemas.

7. The system of claim 1, wherein the processing module comprises a meta-heuristic mapping module configured to identify matches between the source and target schemas based on a set of meta-heuristic mapping checks, wherein at least one of the set of meta-heuristic checks being performed for identifying matches based on structural similarity, functional similarity and relationships between the source and target schemas.

8. The system of claim 7, wherein the set of meta-heuristic mapping check comprises at least one of a genetic algorithm mapping approach and a genetic programming mapping.

9. The system of claim 1, wherein the processing module comprises an instance mapping module configured to identify matches between the source and target schemas based on instance values of the source and target schemas.

10. The system of claim 1 further comprising a validation module configured to validate the identified matches.

11. The system of claim 1 further comprising an output module configured to generate an output based on the identified matches.

12. The system of claim 1, wherein the information repository comprises one or more information sources for identifying matches between the source and target schemas.

13. A method for matching one or more source schemas with one or more target schemas, the method comprising:

gathering inputs pertaining to the one or more source and target schemas, the inputs comprising a set of details in a predefined format;

processing the gathered inputs, to compare the one or more source schemas with the one or more target schemas to identify a set of matches based on linguistic similarity, structural similarity and functional similarity and relationship between the source and target schemas, wherein processing the gathered inputs comprises:

constructing a set of chromosomes for matching the source and target schemas, wherein each chromosome represents a match between at least one source schema element and at least one target schema element;

performing a crossover operation on one or more chromosomes of the set of chromosomes, wherein the crossover operation comprises selecting two chromosomes and interchanging of schema elements between the two chromosomes based on predefined conditions;

performing a mutation operation on one or more chromosomes of the set of chromosomes, wherein the mutation operation comprises modifying each chromosome based on predefined conditions; and identifying matches between the source and target schemas based on fitness values of the constructed set of chromosomes and fitness values of chromosomes obtained from crossover and mutation operations; and storing the identified set of matches.

14. The method of claim 13, wherein processing the gathered inputs further comprises:

tokenizing one or more schema elements of each source and target schema, wherein the tokenization of each schema element comprises identifying one or more tokens for the schema element;

validating the tokenized schema elements, wherein the validation is performed based on one or more information sources; and assigning each validated schema element to one or more groups based on a predefined criteria.

15. The method of claim 13 further comprising performing a data profiling of one or more schema elements of each source and target schema, the data profiling comprises:

analyzing and processing instance values of the schema elements; and categorizing the analyzed schema elements into one or more data profile categories.

16. The method of claim 13 further comprising identifying matches between the source and target schemas based on predetermined mappings between pre-existing source and target schemas.

17. The method of claim 13 further comprising comparing constraints of the source and target schemas to identify matches between the source and target schemas.

18. The method of claim 13 further comprising performing one or more schema mapping checks, the one or more schema mapping checks comprising:

an initial mapping check to identify matches between the source and target schemas based on predetermined mappings between pre-existing source and target schemas;

a constraint mapping check to identify similarity between constraints of the source and target schemas;

a similarity check to identify semantic and syntactic similarity between the source and target schemas;

a set of meta-heuristic mapping checks to identify mapping between one or more source schema elements and one or more target schema elements; and an instance mapping check to compare instance values of the source and target schema elements.

19. The method of claim 13 further comprising validating the identified set of matches.

20. The method of claim 19 further comprising generating an output based on the validation.

21. The method of claim 13, wherein the crossover and mutation operations are performed iteratively on the set of chromosomes and on chromosomes generated from the crossover and mutation operations for a predetermined number of iterations.

22. The method of claim 13, wherein the crossover and mutation operations are performed iteratively on the set of chromosomes and on chromosomes generated from the crossover and mutation operations for obtaining a predetermined number of matches.

23. The method of claim 13, wherein processing the gathered inputs further comprises performing a genetic programming mapping approach for identifying matches between the source and target schemas, the genetic programming mapping approach comprising:

constructing one or more trees for matching the source and target schemas, each tree comprising at least one source schema element, at least one target schema element and one or more operators, wherein each tree represents a match between the source schema element and the target schema element;

performing a set of operations on the constructed trees to generate new trees, each new tree being generated by modifying one or more trees; and identifying matches between the source and target schemas based on fitness values of the one or more trees and the generated new trees.

24. The method of claim 23, wherein the set of operations are performed iteratively on the constructed trees and on the trees generated from the set of operations till a predetermined number of iterations.

25. The method of claim 23, wherein the set of operations are performed iteratively on the constructed trees and on the trees generated from the set of operations for obtaining a (predetermined number of matches.

26. The method of claim 23, wherein the set of operations comprises:

an elitism operation for retaining:
one or more trees in the constructed trees; and
one or more trees of the new trees;
the elitism operation being performed by retaining the trees based on the fitness value of the trees;

a copying operation on one or more of the constructed trees, the copying operation being performed by copying based on predetermined conditions:
one or more trees of the constructed trees; and
one or more trees of the new trees;

a crossover operation on one or more of the constructed trees, the crossover operation being performed by interchanging schema elements between two trees based on predetermined conditions;

a mutation operation on one or more of the constructed trees by:
modifying one or more schema elements in the one or more constructed trees based on predetermined conditions; and
modifying one or more operators in the one or more constructed trees based on predetermined conditions;

an insertion operation on one or more of the constructed trees, the insert operation being performed to insert at least one schema element and one or more operators into the trees based on predetermined conditions; and a merging operation on one or more of the constructed trees to combine two or more trees based on predetermined conditions.

* * * * *